(12) United States Patent
Araki et al.

(10) Patent No.: US 11,268,172 B2
(45) Date of Patent: Mar. 8, 2022

(54) ALUMINUM ALLOY MATERIAL, AND FASTENING COMPONENT, STRUCTURAL COMPONENT, SPRING COMPONENT, CONDUCTIVE MEMBER AND BATTERY MEMBER INCLUDING THE ALUMINUM ALLOY MATERIAL

(71) Applicant: FURUKAWA ELECTRIC CO., LTD., Tokyo (JP)

(72) Inventors: Akiyoshi Araki, Tokyo (JP); Hiroshi Kaneko, Tokyo (JP); Kyota Susai, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 16/544,545

(22) Filed: Aug. 19, 2019

(65) Prior Publication Data

US 2019/0368008 A1    Dec. 5, 2019

Related U.S. Application Data

(63) Continuation of application No. PCT/JP2018/006372, filed on Feb. 22, 2018.

(30) Foreign Application Priority Data

Feb. 23, 2017  (JP) .............................. JP2017-032434
Feb. 23, 2017  (JP) .............................. JP2017-032435

(51) Int. Cl.
*C22C 21/08* (2006.01)
*H01B 1/02* (2006.01)

(52) U.S. Cl.
CPC ............. *C22C 21/08* (2013.01); *H01B 1/023* (2013.01)

(58) Field of Classification Search
CPC ................................ C22C 21/06; C22C 21/08
See application file for complete search history.

(56) References Cited

U.S. PATENT DOCUMENTS

| 5,826,456 A | 10/1998 | Kawazoe et al. |
| 2020/0040432 A1 | 2/2020 | Kaneko |

FOREIGN PATENT DOCUMENTS

| CN | 102500617 A | 6/2012 |
| CN | 103695735 A | 4/2014 |

(Continued)

OTHER PUBLICATIONS

English Translation of Aluminum Handbook (7th Edition), The Corporate Judicial Person, Japan Aluminum Association, Jan. 31, 2007, pp. 36-37.

(Continued)

*Primary Examiner* — George Wyszomierski
*Assistant Examiner* — Janell C Morillo
(74) *Attorney, Agent, or Firm* — Dorsey & Whitney LLP

(57) ABSTRACT

An aluminum alloy material of the present disclosure has an alloy composition containing Mg: 0.50% by mass or more and 6.0% by mass or less, Fe: 0% by mass or more and 1.50% by mass or less, Si: 0% by mass or more and 1.0% by mass or less, one or more selected from Cu, Ag, Zn, Ni, Ti, Co, Au, Mn, Cr, V, Zr and Sn: 0% by mass or more and 2.0% by mass or less in total, with the balance being Al and inevitable impurities. The aluminum alloy material has a fibrous metallographic structure in which crystal grains extend so as to be aligned in one direction, and an average (Continued)

value of sizes perpendicular to longitudinal direction of the crystal grains is 310 nm or less in a cross section parallel to the one direction.

11 Claims, 4 Drawing Sheets

(56) References Cited

FOREIGN PATENT DOCUMENTS

| EP | 3604580 | A1 | | 2/2020 | |
|---|---|---|---|---|---|
| EP | 3739071 | A1 | | 11/2020 | |
| JP | S62170448 | U | | 10/1987 | |
| JP | H05331585 | A | | 12/1993 | |
| JP | H09137244 | A | | 5/1997 | |
| JP | 2001131721 | A | | 5/2001 | |
| JP | 2009024219 | A | | 2/2009 | |
| JP | 4477295 | B2 | | 6/2010 | |
| JP | 2010280969 | A | | 12/2010 | |
| JP | 2012082469 | A | * | 4/2012 | |
| JP | 2012082469 | A | | 4/2012 | |
| JP | 2012149303 | A | | 8/2012 | |
| JP | 2013027172 | A | | 2/2013 | |
| WO | WO-2007080689 | A1 | * | 7/2007 | ............. C22F 1/047 |
| WO | 2013146762 | A1 | | 10/2013 | |
| WO | 2018012482 | A1 | | 1/2018 | |
| WO | 2019138748 | A1 | | 7/2019 | |

OTHER PUBLICATIONS

English translation of Decision to Grant a Patent received in JP Application No. 2018-532342 dated Jan. 7, 2019.
English translation of Notification of Reasons for Refusal received in JP Application No. 2018-532342 received Sep. 10, 2018.
International Search Report and Written Opinion dated May 29, 2018 Yeceived in PCT Application No. PCT/JP2018/006372 (English translation of ISR only).
English translation of the International Preliminary Report on Patentability dated Aug. 27, 2019 received in PCT/JP2018/006372.
English translation of Written Opinion dated May 29, 2018 received in PCT/JP2018/006372.
English translation of Office Action for CN Application No. 201880013503.9, dated Nov. 19, 2020.
Extended European Search Report for EP Application No. 18756592.4, dated Nov. 11, 2020.
English Translation of 2nd Office Action for Chinese Application No. 201880013503.9, dated Jul. 5, 2021.
English Translation of Notice of Reasons for Refusal dated Oct. 11, 2021 for Japanese Application No. 2019-017197.

\* cited by examiner

ALUMINUM ALLOY MATERIAL, AND FASTENING COMPONENT, STRUCTURAL COMPONENT, SPRING COMPONENT, CONDUCTIVE MEMBER AND BATTERY MEMBER INCLUDING THE ALUMINUM ALLOY MATERIAL

CROSS REFERENCE TO RELATED APPLICATIONS

This is a continuation application of International Patent Application No. PCT/JP2018/006372 filed Feb. 22, 2018, which claims the benefit of Japanese Patent Application Nos. 2017-032434 and 2017-032435 filed Feb. 23, 2017, respectively, the full contents of all of which are hereby incorporated by reference in their entirety.

BACKGROUND

Technical Field

The present disclosure relates to an aluminum alloy material having a high strength. Such an aluminum alloy material is used for a wide range of applications (for example, a fastening component, a structural component, a spring component, a conductive member and a battery member).

Description of the Related Art

Conventionally, iron-based or copper-based metal materials have been widely used for transport, equipment such as automobiles and railway vehicles, and for various structural members and fastening members. In recent years, however, substitution of aluminum-based materials has been considered, which have a smaller specific gravity, a larger thermal expansion coefficient, relatively good heat and electrical conductivities, and excellent corrosion resistance compared to iron-based or copper-based metal materials.

Furthermore, with the recent diversification of shapes of metal members, a technique in which a metal powder is sintered using, for example, electron beams or lasers to form a three-dimensional structure into a desired shape has been widely considered. However, use of a metal powder in such a technique has the problem of, for example, easy explosion when the metal powder is excessively fine.

For the above reasons, a technique for forming a three-dimensional structure by methods of, for example, knitting, weaving, tying, jointing, or connecting metal fine wires has been recently developed. Wire-Woven Cellular Materials, for example, have been considered in such methods, and their applications to battery components, heat sinks, impact absorption members and the like are expected.

However, a pure aluminum material has the problem of strength, which is lower than that of iron-based or copper-based metal materials. Furthermore, 2000-series (Al—Cu-based) or 7000-series (Al—Zn—Mg-based) aluminum alloy materials, which are aluminum-based alloy materials having a relatively high strength, have the problem of poor corrosion resistance and poor stress corrosion cracking resistance. Moreover, 6000-series (Al—Mg—Si-based) aluminum alloy materials, which are aluminum-based alloy materials having relatively good electrical and heat conductivities and corrosion resistance, have a high strength for an aluminum-based alloy material, but the strength is still insufficient, and higher strength is required.

Meanwhile, a technique for using a solid solution element has been widely used as a method for increasing strength of aluminum alloy. For example, Japanese Patent Application Publication No. 2012-082469 discloses a method in which high strength is achieved by containing Mg at high concentrations. Furthermore, Japanese Patent Application Publication No. 2003-027172 discloses a method for producing Al—Mg-based alloy having a fine structure by controlling the rolling temperature. However, although these methods have excellent industrial mass productivity, further increased strength is required.

Moreover, a method using crystallization of an aluminum alloy raw material containing an amorphous phase (Japanese Patent Application Publication No. H05-331585), a method for forming fine crystal grains according to an Equal-Channel Angular Pressing (ECAP) method (Japanese Patent Application Publication No. H09-137244), and a method for forming fine crystal grains by cold working at room temperature or less (Japanese Patent Application Publication No. 2001-131721) or the like are also known as a method for improving the strength of aluminum alloy materials. However, the size of the aluminum alloy material produced was small in all of these methods, and thus putting them into practical use in an industrial scale was difficult.

Furthermore, Japanese Patent Application Publication No. 2009-24219 discloses a method of producing Al—Mg-based alloy having a fine structure by adding a large amount of Mg and cold rolling. The problem with this method is poor processability caused by the large amount of Mg, which requires a special process for preparing alloy.

SUMMARY

The present disclosure is related to providing an aluminum alloy material having a high strength, which can be an alternative to iron-based or copper-based metal materials, and a fastening component, a structural component, a spring component, a conductive member and a battery member including the aluminum alloy material.

According to an aspect of the present disclosure, an aluminum alloy material has an alloy composition containing Mg: 0.50% by mass or more and 6.0% by mass or less, Fe: 0% by mass or more and 1.50% by mass or less, Si: 0% by mass or more and 1.0% by mass or less, one or more selected from Cu, Ag, Zn, Ni, Ti, Co, Au, Mn, Cr, V, Zr and Sn: 0% by mass or more and 2.0% by mass or less in total, with the balance being Al and inevitable impurities. The aluminum alloy material has a fibrous metallographic structure in which crystal grains extend so as to be aligned in one direction, and an average value or sizes perpendicular to longitudinal direction of the crystal grains is 310 nm or less in a cross section parallel to the one direction.

Further, it is preferable that the aluminum alloy material contains Mg: 0.50% by mass or more and less than 2.0% by mass and Si: 0% by mass or more and 0.20% by mass or less.

Further, it is preferable that the aluminum alloy material contains Mg: 2.0% by mass or more and 6.0% by mass or less.

Further, it is preferable that the aluminum alloy material contains Mg: 3.0% by mass or more.

Further, it is preferable that the aluminum alloy material has a Vickers hardness (HV) of 125 to 280.

Further, it is preferable that the aluminum alloy material contains one or more selected from Cu, Ag, Zn, Ni, Ti, Co, Au, Mn, Cr, V, Zr and Sn: 0.06% by mass or more in total.

Further, it is preferable that the aluminum alloy material contains one or more members selected from the group consisting of Cu: 0.05% by mass or more and 0.20% by mass or less, Mn: 0.3% by mass or more and 1.0% by mass or less, Cr: 0.05% by mass or more and 0.20% by mass or less and Zr: 0.02% by mass or more and 0.20% by mass or less.

Further, it is preferable that the aluminum alloy material has a tensile strength of 300 MPa or more as measured after being heated at 110° C. tor 24 hours.

According to another aspect of the present disclosure, a fastening component contains the aluminum alloy material.

According to another aspect of the present disclosure, a structural component contains the aluminum alloy material.

According to another aspect of the present disclosure, a spring component contains the aluminum alloy material.

According to another aspect of the present disclosure, a conductive member contains the aluminum alloy material.

According to another aspect of the present disclosure, a battery member contains the aluminum alloy material.

The present disclosure can provide an aluminum alloy material having a high strength comparable to that of an iron-based or copper-based metal material, and a fastening component, a structural component, a spring component, a conductive member and a battery member including the aluminum alloy material, by the aluminum alloy material having a predetermined alloy composition and having a fibrous metallographic structure in which crystal grains extend so as to be aligned in one direction, and an average value of sizes perpendicular to longitudinal direction of the crystal grains being 310 nm or less in a cross section parallel to the one direction.

DETAILED DESCRIPTION

Hereinafter, preferred embodiments of an aluminum alloy material of the present disclosure will be described in detail.

The aluminum alloy material according to the present disclosure has an alloy composition containing Mg: 0.50% by mass or more and 6.0% by mass or less, Fe: 0% by mass or more and 1.50% by mass or less, Si: 0% by mass or more and 1.0% by mass or less, one or more selected from Cu, Ag, Zn, Ni, Ti, Co, Au, Mn, Cr, V, Zr and Sn: 0% by mass or more and 2.0% by mass or less in total, with the balance being Al and inevitable impurities, wherein the aluminum alloy material has a fibrous metallographic structure in which crystal grains extend so as to be aligned in one direction, and an average value of sixes perpendicular to longitudinal direction of the crystal grains is 310 nm or less in a cross section parallel to the one direction.

Mere, of the components whose range of the content is specified in the above alloy composition, each component whose lower limit of the range of the content is described as "0% by mass" means a component whose amount is appropriately reduced or which is optionally added as necessary. In other words, when the amount of these components is "0% by mass," it means that those components are not included.

As used herein, "crystal grains" refer to a portion surrounded by boundaries of misorientation. Here, the "boundary of misorientation" refers to a boundary at which contrast (channeling contrast) varies discontinuously when a metallographic structure is observed by, for example, scanning transmission electron microscopy (STEM) or scanning ion microscopy (SIM). Furthermore, the size perpendicular to longitudinal direction of crystal grains corresponds to the distance between the boundaries of misorientation.

Figure 1:
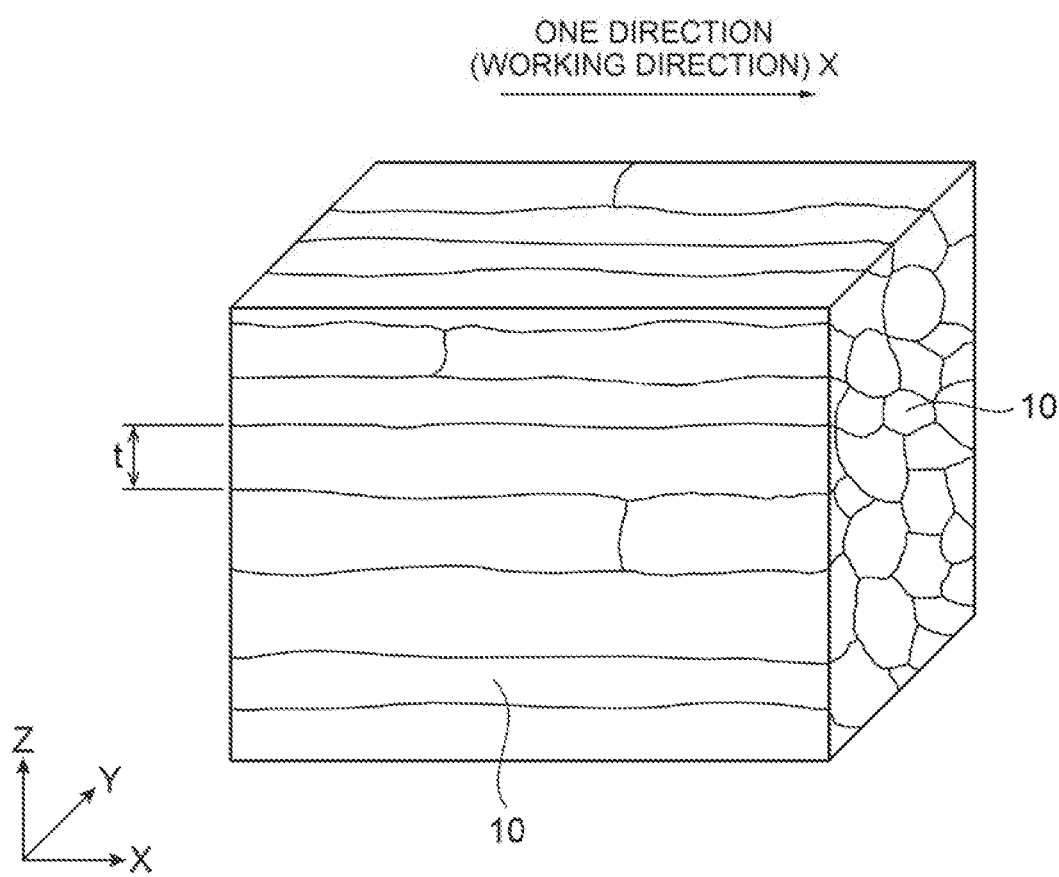
FIG. 1 is a perspective view schematically showing the state of the metallographic structure of an aluminum alloy material according to the present disclosure.

Moreover, the aluminum alloy material according to the present disclosure has a fibrous metallographic structure in which crystal grains extend so as to be aligned in one direction. In this regard, a perspective view schematically showing the state of the metallographic structure of the aluminum alloy material of the present disclosure is shown in FIG. 1. As shown in FIG. 1, the aluminum alloy material of the present disclosure has a fibrous structure in which crystal grains 10 having an elongated shape extend so as to be aligned in one direction X. Such crystal grains having an elongated shape are completely different from conventional fine crystal grains or flat crystal grains only having high aspect ratios. More specifically, the crystal grain according to the present disclosure has an elongated shape like fiber, and an average value of sizes t perpendicular to longitudinal direction (working direction X) of the crystal grain is 310 nm or less. The fibrous metallographic structure in which such fine crystal grains extend so as to be aligned in one direction can be said to be a novel metallographic structure that has not been available in conventional aluminum alloys.

The aluminum alloy material of the present disclosure has a fibrous metallographic structure in which crystal grains extend so as to be aligned in one direction, and in a cross section parallel to the one direction, the average value of sizes perpendicular to longitudinal direction of the crystal grains is controlled to 310 nm or less, and therefore a high strength comparable to that of iron-based or copper-based metal materials (e.g., a 0.2% yield strength of 400 MPa or more and a Vickers hardness (HV) of 125 or more) can be achieved.

Furthermore, making crystal grain sizes small not only improves strength, but also directly produces the effect of improving grain boundary corrosion, the effect of improving fatigue characteristics, the effect of reducing roughness of the surface after plastic working, and the effect of reducing sagging and burr in shearing working, or the like, thereby increasing the overall function of materials.

(1) Alloy Composition

First Embodiment

The alloy composition of the aluminum alloy material of the first embodiment of the present disclosure and its effects will be described.

(Essential Components to be Added)

In the first embodiment of the aluminum alloy material of the present disclosure, the aluminum alloy material contains 0.50% by mass or more and less than 2.0% by mass of Mg.

<Mg: 0.50% by Mass or More and Less Than 2.0% by Mass>

Mg (magnesium) forms a solid solution in an aluminum matrix and thus has the effect of increasing strength, and has the effect of stabilizing fine crystals to refine crystals. When the content of Mg is 2.0% by mass or more, processability is poor and cracking is likely to occur during working at a relatively high degree of working of more than 5. When the content of Mg is less than 0.50% by mass, the effect of refining crystals is low and the desired metallographic structure cannot be obtained. Thus, the content of Mg is preferably 0.50% by mass or more and less than 2.0% by mass, more preferably 0.50% by mass or more and less than 1.0% by mass in order to obtain the effect of refining crystals at a relatively high degree of working of more than 5. Due to the above content of Mg being satisfied, a specific metallographic structure in which an average value of sizes perpendicular to longitudinal direction of the crystal grains is 310 nm or less can be obtained at a relatively high degree of working of more than 5.

(Component for Improving Strength)

In the first embodiment of the aluminum alloy material of the present disclosure, the content of Fe is 0% by mass or more and 1.50% by mass or less.

<Fe: 0% by Mass or More and 150% by Mass or Less>

Fe (iron) crystalizes or precipitates during casting and homogenizing heat treatment to form an intermetallic compound with aluminum, or with aluminum and other additive elements, such as an Al—Fe-based, Al—Fe—Si-based or Al—Fe—Si—Mg-based compound. An intermetallic compound mainly composed of Fe and Al as those described above is called a Fe-based compound in the present specification. The Fe-based compound contributes to refining crystal grains and improves tensile strength. Fe which forms solid solution in aluminum also has the effect of improving tensile strength. The larger the content of Fe, the larger the amount of the Fe-based compound, and this contributes to the improvement of strength. However, when the content of Fe is more than 1.50% by mass, the amount of the Fe-based compound is excessively increased and thus processability is decreased. When the cooling rate in casting is low, dispersion of the Fe-based compound is sparse, and thus there are more negative effects. Thus, the content of Fe is 0% by mass or more and 1.50% by mass or less, preferably 0.02% by mass or more and 0.80% by mass or less, more preferably 0.03% by mass or more and 0.50% by mass or less, further preferably 0.04% by mass or more and 0.35% by mass or less, and still more preferably 0.05% by mass or more and 0.25% by mass or less.

(Component to be Controlled)

In the first embodiment of the aluminum alloy material of the present disclosure, the content of Si is 0% by mass or more and 0.20% by mass or less.

<Si: 0% by Mass or More and 0.20% by Mass or Less>

Si (silicon) is a component which crystalizes or precipitates during casting and homogenizing heat treatment to form, for example, an Al—Fe—Si-based or Al—Fe—Si—Mg-based intermetallic compound. An intermetallic compound mainly including Fe and Si as those described above is called a FeSi-based intermetallic compound in the present specification. This intermetallic compound contributes to refining crystal grains and improves tensile strength. However, the FeSi-based intermetallic compound, which inevitably crystalizes or precipitates in casting, is likely to reduce processability. Thus, the content of Si should be reduced and controlled to 0.02% by mass or less in order to suppress the formation of the FeSi-based intermetallic compound to obtain good processability. It Is preferable to reduce the content of Si as much as possible, but the content may be 0.01% by mass or more for practical use in consideration of its inevitable inclusion in the process of manufacture. Thus, the content of Si is 0% by mass or more and 0.20% by mass or less, preferably 0% by mass or more and 0.15% by mass or less, and more preferably 0% by mass or more and 0.10% by mass or less.

(Components Optionally Added)

In the first embodiment of the aluminum alloy material of the present disclosure, the aluminum alloy material may contain 0% by mass or more and 2.0% by mass or less in total of one or more selected from Cu, Ag, Zn, Ni, Ti, Co, Au, Mn, Cr, V, Zr and Sn as an optional additive element in addition to Mg, which is an essential component to be added.

<One or More Selected from Cu, Ag, Zn, Ni, Ti, Co, Au, Mn, Cr, V, Zr and Sn: 0% by Mass or More and 2.0% by Mass or Less in Total>

Cu (copper), Ag (silver), Zn (zinc), Ni (nickel), Ti (titanium), Co (cobalt), Au (gold), Mn (manganese), Cr (chromium), V (vanadium), Zr (zirconium) and Sn (tin) are all an element which particularly improves heat resistance. The content of these components is preferably 0.06% by mass or more in total in order to exert such effects sufficiently. However, when the content of these components is more than 2.0% by mass in total, processability is reduced. Thus, the content of one or more selected from Cu, Ag, Zn, Ni, Ti, Co, Au, Mn, Cr, V, Zr and Sn is 2.0% by mass or less, preferably 0.06% by mass or more, and more preferably 0.3% by mass or more and 1.2% by mass or less in total. The content of these components may be 0% by mass. One of these components may be added alone or two or more of them may be added in combination. It is preferable that any one or more selected from Zn, Ni, Co, Mn, Cr, V, Zr and Sn is contained in consideration of corrosion resistance in the case of using in a corrosive environment.

Furthermore, it is more preferable that the aluminum alloy material contains, of the above components, one or more members selected from the group consisting of Cu: 0.05% by mass or more and 0.20% by mass or less, Mn: 0.3% by mass or more and 1.0% by mass or less, Cr: 0.05% by mass or more and 0.20% by mass or less and Zr: 0.02% by mass or more and 0.20% by mass or less. These components have a high diffusion coefficient in the state of solid solution and have an atomic size significantly different from that of aluminum, and thus reduce grain boundary energy. Furthermore, these components also form a fine intermetallic compound with aluminum to reduce mobility of grain boundaries. These are synergistically effective for preventing coarsening of fine crystals and preventing reduction of strength caused by heat treatment. The lower limit of the content of the respective components is more preferred in order to exert the above effects. The upper limit of the content of the respective components is more preferred in order to prevent coarse precipitates from being formed and processability from being reduced.

<Balance: Al and Inevitable Impurities>

The balance other than the above components includes aluminum and inevitable impurities. As used herein, inevitable impurities mean impurities included at an unavoidable level in the process of manufacture. Such inevitable impurities may cause a reduction in conductivity depending on the content, and thus it is preferable to control the content of the impurities to some extent in consideration of the reduction in conductivity. Examples of inevitable impurities include B (boron), Bi (bismuth), Pb (lead), Ga (gallium), and Sr (strontium). The upper limit of the content of the respective components may be 0.05% by mass, and the upper limit of the total content of the components may be 0.15% by mass.

Second Embodiment

Next, the alloy composition of the aluminum alloy material of the second embodiment of the present disclosure and its effects will be described.

(Essential Components to be Added)

In the second embodiment of the aluminum alloy material of the present disclosure, the aluminum alloy material contains 2.0% by mass or more and 6.0% by mass or less of Mg.

<Mg: 2.0% by Mass or More and 6.0% by Mass or Less>

Mg (magnesium) forms a solid solution in an aluminum matrix and thus has the effect of increasing strength, and has the effect of stabilizing fine crystals to refine crystals. The content of Mg is preferably 2.0% by mass or more, and more preferably 3.0% by mass or more in order to obtain the effect of refining crystals at a relatively low degree of working of 5 or less. When the content of Mg is less than 2.0% by mass, the effect of refining crystals is low at a relatively low degree of working of 5 or less and it is difficult to obtain the desired metallographic structure. When the content of Mg is more than 6.0% by mass, processability is poor and thus cracking occurs during working. Due to the above content of Mg being satisfied, a specific metallographic structure in which an average value of sizes perpendicular to longitudinal direction of the crystal grains is 310 nm or less can be obtained at a relatively low degree of working of 5 or less.

(Component for Improving Strength)

In the second embodiment of the aluminum alloy material of the present disclosure, the content of Fe is 0% by mass or more and 1.50% by mass or less.

<Fe: 0% by Mass or More and 150% by Mass or Less>

Fe (iron) crystalizes or precipitates during casting and homogenizing heat treatment to form an intermetallic compound with aluminum, or with aluminum and other additive elements, such as Al—Fe-based, Al—Fe—Si-based or Al—Fe—Si—Mg-based compound. The Fe-based compound contributes to refining crystal grains and improves tensile strength. Fe which forms solid solution in aluminum also has the effect of improving tensile strength. The larger the content of Fe, the larger the amount of the Fe-based compound, and this contributes to the improvement of strength. However, when the content of Fe is more than 1.50% by mass, the amount of the Fe-based compound is excessively increased and thus processability is decreased. When the cooling rate in casting is tow, dispersion of the Fe-based compound is sparse, and thus there are more negative effects. Thus, the content of Fe is 0% by mass or more and 150% by mass or less, preferably 0.02% by mass or more and 0.80% by mass or less, more preferably 0.03% by mass or more and 0.50% by mass or less, further preferably 0.04% by mass or more and 0.35% by mass or less, and still more preferably 0.05% by mass or more and 0.25% by mass or less.

(Component to be Controlled)

In the second embodiment of the aluminum alloy material of the present disclosure, the content of Si is 0% by mass or more and 1.0% by mass or less.

<Si: 0% by Mass or More and 1.0% by Mass or Less>

Si (silicon) is a component which crystalizes or precipitates during casting and homogenizing heat treatment to form, for example, a Mg—Si-based, Al—Fe—Si-based or Al—Fe—Si—Mg-based intermetallic compound. An intermetallic compound mainly including Mg and Si as those described above is called a MgSi-based intermetallic compound in the present specification. When the content of Mg is 2.0% by mass or more, Si is likely to crystalize or precipitate in the form of a MgSi-based intermetallic compound, and contributes to refining crystal grains and improves tensile strength. When the content of Si is more than 1.0% by mass, Si is likely to crystalize or precipitate in the form of a FeSi-based intermetallic compound, and may a cause reduction in processability. Thus, the content of Si should be reduced and controlled to 1.0% by mass or less in order to suppress the formation of the FeSi-based intermetallic compound to obtain good processability. It is preferable to reduce the content of Si as much as possible, but the lower limit of the content may be 0.01% by mass or more for practical use in consideration of its inevitable inclusion in the process of manufacture. Thus, the content of Si is 0% by mass or more and 1.0% by mass or less, preferably 0% by mass or more and 0.60% by mass or less, more preferably 0% by mass or more and 0.40% by mass or less, and further preferably 0% by mass or more and 0.20% by mass or less.

(Components Optionally Added)

As is the case with the first embodiment, the aluminum alloy material of the second embodiment may contain 0% by mass or more and 2.0% by mass or less in total of one or more selected from Cu, Ag, Zn, Ni, Ti, Co, Au, Mn, Cr, V, Zr and Sn as an optional additive element in addition to Mg which is an essential component to be added.

<One or More Selected from Cu, Ag, Zn, Ni, Ti, Co, Au, Mn, Cr, V, Zr and Sn: 0% by Mass or More and 2.0% by Mass or Less in Total>

Cu (copper), Ag (silver), Zn (zinc), Ni (nickel), Ti (titanium), Co (cobalt), Au (gold), Mn (manganese), Cr (chromium), V (vanadium), Zr (zirconium) and Sn (tin) are all an element which particularly improves heat resistance. The content of these components is preferably 0.06% by mass or more in total in order to exert such effects sufficiently. However, when the content of these components is more than 2.0% by mass in total, processability is reduced. Thus, the content of one or more selected from Cu, Ag, Zn, Ni, Ti, Co, Au, Mn, Cr, V, Zr and Sn is 2.0% by mass or less, preferably 0.06% by mass or more, and more preferably 0.3% by mass or more and 1.2% by mass or less in total. The content of these components may be 0% by mass. One of these components may be added alone or two or more of them may be added in combination. It is preferable that any one or more selected from Zn, Ni, Co, Mn, Cr, V, Zr and Sn is contained in consideration of corrosion resistance in the case of using in a corrosive environment.

Furthermore, it is more preferable that the aluminum alloy material contains, of the above components, one or more members selected from the group consisting of Cu: 0.05% by mass or more and 0.20% by mass or less, Mn: 0.3% by mass or more and 1.0% by mass or less, Cr: 0.05% by mass or more and 0.20% by mass or less and Zr: 0.02% by mass or more and 0.20% by mass or less. These components have a high diffusion coefficient in the state of solid solution and have an atomic size significantly different from that of aluminum, and thus reduce grain boundary energy. Furthermore, these components also form a fine intermetallic compound with aluminum to reduce mobility of grain boundaries. These are synergistically effective for preventing coarsening of fine crystals and preventing reduction of strength caused by heat treatment. The lower limit of the content of the respective components is more preferred in order to exert the above effects. The upper limit of the content of the respective components is more preferred in order to prevent coarse precipitates from being formed and processability from being reduced.

<Balance: Al and Inevitable Impurities>

The balance other than the above components includes aluminum and inevitable impurities. As used herein, inevitable impurities mean impurities included at an unavoidable level in the process of manufacture. Such inevitable impurities may cause a reduction in conductivity depending on the content, and thus it is preferable to control the content of the impurities to some extent in consideration of the reduction in conductivity. Examples of inevitable impurities include B (boron), Bi (bismuth), Pb (lead), Ga (gallium), and Sr (strontium). The upper limit of the content of the respective components may be 0.05% by mass, and the upper limit of the total content of the components may be 0.15% by mass.

Such an aluminum alloy material can be obtained by combining and controlling alloy compositions and manufacturing processes. Hereinafter, a suitable method of manufacturing the aluminum alloy material of the present disclosure will be described.

(2) Method of Manufacturing Aluminum Alloy Material According to One Example of the Present Disclosure A high strength of the aluminum alloy material according to one example of the present disclosure is achieved by introducing crystal grain boundaries into, in particular, an Al—Mg-based alloy at a high density. This approach of achieving a high strength is therefore significantly different from methods of precipitation-hardening of Mg—Si compounds, which have been usually used for preparing conventional aluminum alloy materials.

In a preferred method of manufacturing the aluminum alloy material of the present disclosure, an aluminum alloy raw material having a predetermined alloy composition is subjected to cold working [1] at a degree of working of 5 to 11 as the final working, in the first embodiment, and is subjected to cold working [1] at a degree of working of 2 to 5 as the final working, in the second embodiment. Furthermore, refine annealing [2] may be performed after cold working [1] in the respective embodiments if necessary. In the present specification, refine annealing includes a stabilization treatment. Details will be described below.

When stress of deformation is applied to a metal material, usually crystal slip, as an elementary step of deformation of metal crystals, occurs. The more likely the crystal slip is to occur in a metal material, the smaller the stress required for deformation, and the lower the strength of the metal material. Thus, it is important to suppress crystal slip occurring in the metallographic structure to improve the strength of a metal material. Examples of factors which inhibit crystal slip include crystal grain boundaries in the metallographic structure. When stress of deformation is applied to a metal material, such crystal grain boundaries can prevent propagation of crystal slip in the metallographic structure, and as a result, the strength of the metal material is improved.

Thus, it is preferable to introduce crystal grain boundaries into the metallographic structure at a high density in order to improve the strength of the metal material. In this regard, mechanisms of forming crystals grain boundaries may include, for example, the following division of metal crystal caused by deformation of a metallographic structure. The inside of a polycrystalline material is usually in a complicated multiaxial stress state due to the difference in orientation of adjacent crystal grains and spatial distribution of distortion between a portion near the surface layer in contact with a working tool and the inside of bulk. Crystal grains which have been in single orientation before deformation will be divided in several orientations due to deformation under such influences to form a crystal grain boundary between divided crystals.

However, the crystal grain boundary formed has interracial energy with a structure deviated from a usual close-packed atomic arrangement of 12 coordination. Thus, it is considered that, in a usual metallographic structure, increased internal energy serves as the driving force for dynamic or static recovery and crystallization to occur when the density of crystal grain boundaries reaches a certain level or more. Therefore, usually even when the amount of deformation is increased, the density of grain boundaries is considered to be saturated because crystal grain boundaries are increased and decreased simultaneously.

Figure 2:
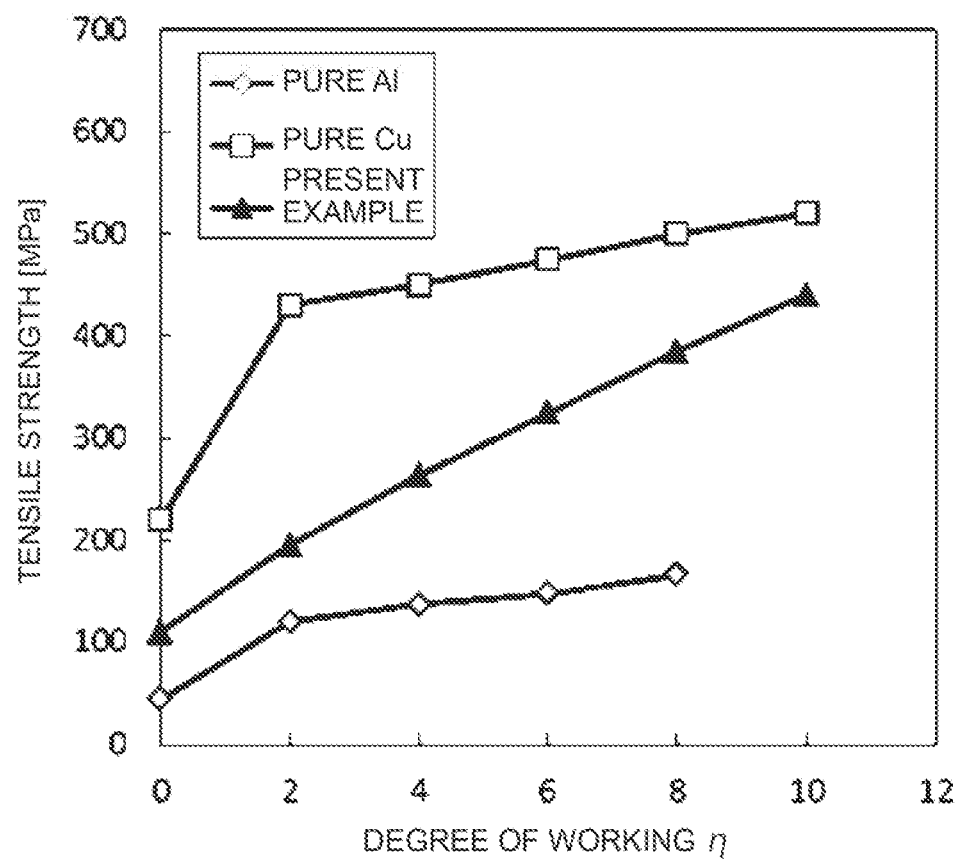
FIG. 2 is a graph showing the relationship between the degree of working and the tensile strength of pure aluminum, pure copper, and the aluminum alloy material according to a first embodiment of the present disclosure.

This phenomenon is also consistent with the relationship between the degree of working and the tensile strength of pure aluminum and pure copper, which have a conventional metallographic structure. FIG. 2 is a graph showing the relationship between the degree of working and the tensile strength of pure aluminum, pure copper and the aluminum alloy material according to the first embodiment of the present disclosure. Furthermore, FIG. 3 is a graph showing the relationship between the degree of working and the tensile strength of pure aluminum, pure copper and the aluminum alloy material according to the second embodiment of the present disclosure.

Figure 3:
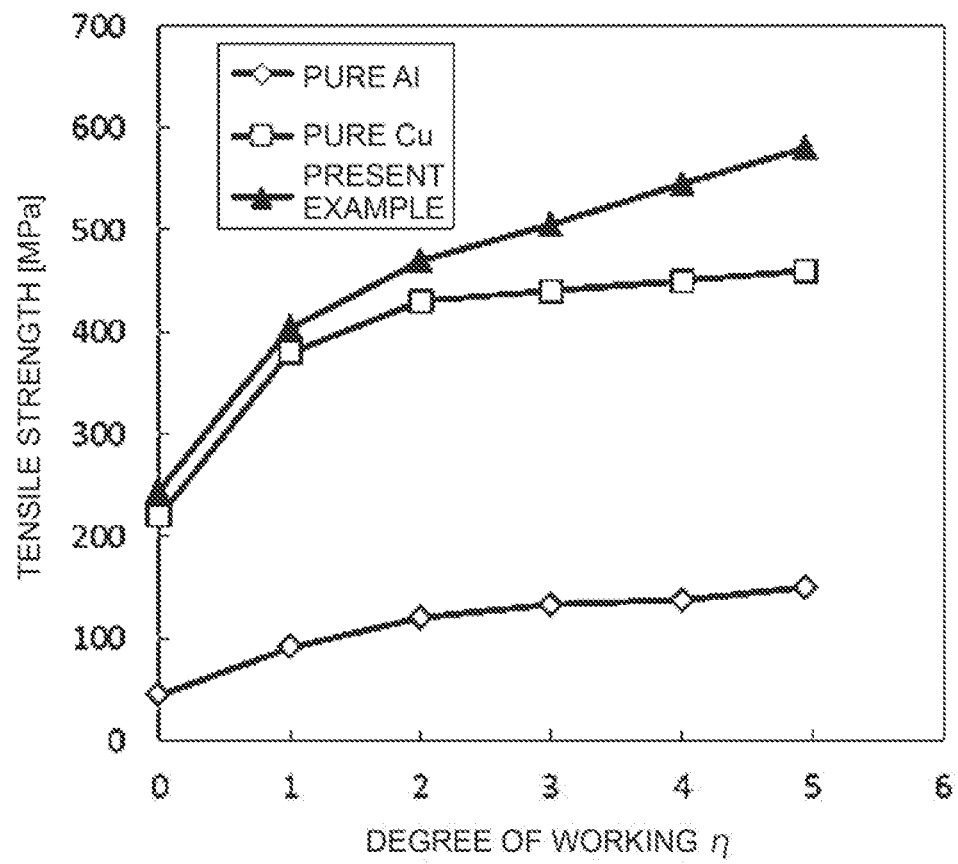
FIG. 3 is a graph showing the relationship between the degree of working and the tensile strength of pure aluminum, pure copper, and an aluminum alloy material according to a second embodiment of the present disclosure.

As shown in FIGS. 2 and 3, although the tensile strength of pure aluminum and pure copper, which have a usual metallographic structure, is improved (those metals are hardened) at a relatively low degree of working, the higher the degree of working, the more the amount of hardening tends to be saturated. In this regard, the degree of working is considered to correspond to the amount of deformation applied to the above metallographic structure, and the saturation of the amount of hardening is considered to correspond to the saturation of the density of grain boundaries.

By contrast, it has been found that the aluminum alloy material of the present disclosure is continuously hardened even when the degree of working is increased, and its strength continues to be increased with working. This may be because the above alloy composition of the aluminum alloy material of the present disclosure, in particular, a predetermined amount of Mg, facilitates the increase in the density of crystal grain boundaries, and also can suppress the increase in internal energy even when the density of crystal grain boundaries reaches a certain level or more in the metallographic structure. As a result, it is considered that recovery and reprecipitation in the metallographic structure can be prevented, and crystal grain boundaries are effectively increased in the metallographic structure.

Such a mechanism of refining crystals by the addition of Mg is not very clear, but the mechanism may be based on (i) promoting division of crystals by formation of microband facilitated by Mg, which strongly interacts with lattice defects including dislocation; and (ii) reducing a mismatch of atomic arrangement in grain boundaries by an Mg atom having an atomic radius larger than that of an Al atom to be able to suppress effectively an increase in the internal energy caused by working.

In the present disclosure, the degree of working in cold working is more than 5 in the first embodiment and is 2 or more and 5 or less in the second embodiment. In the respective embodiments, in particular, working at a high degree of working can facilitate division of metal crystal caused by deformation of the metallographic structure and allows crystals grain boundaries to be introduced into the aluminum alloy material at a high density. As a result, the strength of the aluminum alloy material is significantly improved. Such a degree of working is preferably 6 or more, and more preferably 9 or more in the first embodiment. The upper limit thereof, which is not particularly limited, is usually 15. Furthermore, the degree of working is preferably 3 or more, and more preferably 4 or more in the second embodiment. The upper limit thereof, which is not particularly limited, is usually 5 or less in order to prevent working cracks.

Degree of working η is represented by the following formula (1) in which s1 represents the cross-sectional area before working and s2 represents the cross-sectional area after working (s1>s2).

$$\text{Degree of working (non-dimension): } \eta = \ln(s1/s2) \quad (1)$$

The working rate is preferably set to 98.2% or more, and more preferably 99.8% or more. Working rate R is represented by the following formula (2) using s1 and s2 described above.

$$\text{Working rate (\%): } R = \{(s1-s2)/s1\} \times 100 \quad (2)$$

Furthermore, methods of working may be appropriately selected according to the intended shape of the aluminum alloy material (e.g., a wire bar, a plate, a strip and foil). Examples thereof include using a cassette roller die, groove roll rolling, round wire rolling, drawing using a die or the like, and swaging. Conditions of the above working (e.g., the type of lubricating oils, working speed and heat generation in working) may be appropriately adjusted in the known range.

Aluminum alloy raw materials are not particularly limited as long as they have the above alloy composition. For example, an extruded material, an ingot material, a hot-rolled material and a cold-rolled material may be selected and used according to the purpose of use.

In the present disclosure, refine annealing [2] may be performed after cold working [1] in order to release residual stress and improve elongation. When refine annealing [2] is performed, the treatment temperature is set to 50 to 160° C. When the treatment temperature of refine annealing [2] is less than 50° C., the above effect is unlikely to be achieved. When the temperature is more than 160° C., crystal grains grow due to recovery and recrystallization and thus the strength is reduced. The retention time of refine annealing [2] is preferably 1 to 48 hours. These conditions of heat treatment may be appropriately adjusted according to the type and the amount of inevitable impurities and the state of solid solution/precipitation of the aluminum alloy raw material.

In the present disclosure, the aluminum alloy raw material is worked at a high degree of working by a method such as drawing using a die or rolling as described above. Therefore, as a result, an elongated aluminum alloy material is obtained. By contrast, it is difficult to obtain such an elongated aluminum alloy material by a conventional method for manufacturing an aluminum alloy material, such as powder sintering, compression torsion working, High pressure torsion (HPT), forge working, or Equal Channel Angular Pressing (ECAP). The aluminum alloy material of the present disclosure is manufactured so as to have a length of preferably 10 m or more. The upper limit of the length of the aluminum alloy material in manufacturing is not particularly limited, and is preferably 10,000 m in consideration of workability and the like.

Furthermore, increasing the degree of working is effective for refining crystal grains of the aluminum alloy material of the present disclosure as described above. Thus, when a wire rod and a bar are manufactured, the smaller the diameter, the more easily the configuration of the present disclosure is achieved, and when a plate and foil are manufactured, the smaller the thickness, the more easily the configuration of the present disclosure is achieved.

In particular, when the aluminum alloy material of the present disclosure is in the form of a wire rod, the wire rod has a diameter of preferably 3.5 mm or less, more preferably 2.5 mm or less, further preferably 1.5 mm or less, and particularly preferably 1.0 mm or less in the first embodiment. The lower limit is not particularly limited, and is preferably 0.05 mm in consideration of workability and the like. The wire rod has a diameter of preferably 10 mm or less, more preferably 7.5 mm or less, further preferably 5.0 mm or less, and particularly preferably 3.5 mm or less in the second embodiment.

When the aluminum alloy material of the present disclosure is in the form of a bar, the bar has a diameter or a side length such that the degree of working is comparable to that for a wire rod, which is, for example, 25 mm or less, more preferably 20 mm or less, further preferably 15 mm or less, and particularly preferably 10 mm or less.

When the aluminum alloy material of the present disclosure is in the form of a plate, the plate has a thickness of preferably 2.0 mm or less, more preferably 1.5 mm or less, further preferably 1.0 mm or less, and particularly preferably 0.5 mm or less. The lower limit is not particularly limited, and is preferably 0.020 mm in consideration of workability and the like.

Furthermore, while the aluminum alloy material of the present disclosure may be worked to be narrow or thin as described above, a plurality of such aluminum alloy materials may be prepared and joined to be wide or thick and the resultant may be used for the intended purpose. A known method may be used as the method of joining, and examples thereof include pressure welding, welding, joining using an adhesive, and friction stirring joining. For an aluminum alloy material in the form or a wire bar, a plurality of wire bars are bundled and twisted to form an aluminum alloy twisted wire, and this may be used for the intended purpose. The step of refine annealing [2] described above may also be performed alter working of joining or twisting of an aluminum alloy material which has been subjected to cold working [1] described above.

(3) Characteristics of Organization of Aluminum Alloy Material of the Present Disclosure The aluminum alloy material of the present disclosure manufactured by the above method has a metallographic structure into which crystal grain boundaries are introduced at a high density. The aluminum alloy material of the present disclosure has a fibrous metallographic structure in which crystal grains extend so as to be aligned in one direction and, an average value of sizes perpendicular to longitudinal direction of the crystal grains is 310 nm or less in a cross section parallel to the one direction. The aluminum alloy material has a specific metallographic structure that has not been available before and thus can give a significantly high strength.

The aluminum alloy material of the present disclosure has a fibrous metallographic structure in which crystal grains having an elongated shape extend so as to be aligned in one direction in a fibrous form. As used herein, "one direction" corresponds to the working direction of an aluminum alloy material. When the aluminum alloy material is in the form of a wire rod or a bar, the direction corresponds to, for example, the direction of wire drawing, and when in the form of a plate or foil, the direction corresponds to, for example the direction of rolling, respectively. The aluminum alloy material of the present disclosure exhibits a particularly excellent strength with respect to tensile stress parallel to such working directions.

The above one direction preferably corresponds to longitudinal direction of the aluminum alloy material. More specifically, usually the working direction of an aluminum alloy material corresponds to longitudinal direction of the aluminum alloy material, unless the aluminum alloy material is divided into pieces having a size smaller than the size perpendicular to the working direction.

Furthermore, in a cross section parallel to the one direction described above, an average value of sizes perpendicular to longitudinal direction of the crystal grains is 310 nm or less, preferably 270 nm or less, further preferably 220 nm or less, particularly preferably 170 nm or less, and still more preferably 120 nm or less. Crystal grain boundaries are formed at a high density in the fibrous metallographic structure in which crystal grains having a small diameter (size perpendicular to longitudinal direction of the crystal grains) extend so as to be aligned in one direction. This metallographic structure can effectively inhibit crystal slip caused by deformation and can achieve a high strength which has not been available before. The smaller the average value of sizes perpendicular to longitudinal direction of crystal grains, the better in order to achieve a high strength. The lower limit thereof in manufacture or in a physical point of view, is, for example, 20 nm.

Furthermore, the size in longitudinal direction of the above crystal grains is not necessarily specified, and is preferably 1,200 nm or more, more preferably 1,700 nm or more, and further preferably 2,200 nm or more. The above crystal grain has an aspect ratio of preferably 10 or more, more preferably 20 or more.

(4) Characteristics of Aluminum Alloy Material of the Present Disclosure

[0.2% Yield Strength]

0.2% yield strength is measured in accordance with JIS Z2241:2011. Conditions of measurement will be described in detail in the section of Examples below.

When the aluminum alloy material of the present disclosure is particularly in the form of a wire rod or a bar, the aluminum alloy material has a 0.2% yield strength of preferably 400 MPa or more. This is comparable to the strength of a usual copper wire prepared by high strength wire drawing. The aluminum alloy material has a 0.2% yield strength of more preferably 460 MPa or more, further preferably 520 MPa or more, particularly preferably 580 MPa or more, and still more preferably 650 MPa or more. The aluminum alloy material of the present disclosure having such a high strength may be used as an alternative to materials prepared by high strength wire drawing of Cu—Sn-based or Cu—Cr-based dilute copper alloy. The aluminum alloy material may also be used as an alternative to steel-based or stainless steel-based materials. The upper limit of the 0.2% yield strength of the aluminum alloy material of the present disclosure is not particularly limited, and is, for example, 800 MPa, and preferably 750 MPa.

[Vickers Hardness (HV)]

Vickers hardness (HV) is measured in accordance with JIS Z 2244:2009. Conditions of measurement will be described in detail in the section of Examples below. For the measurement of Vickers hardness of a worked product which has already been assembled, the product may be disassembled and the cross-section may be mirror-polished to measure the Vickers hardness of the cross-section.

When the aluminum alloy material of the present disclosure is particularly in the form of a wire rod or a bar, the aluminum alloy material has a Vickers hardness (HV) of preferably 125 or more. This is comparable to the strength of a usual copper wire prepared by wire drawing of at a high degree of working. The aluminum alloy material has a Vickers hardness (HV) of more preferably 140 or more, further preferably 150 or more, particularly preferably 160 or more, and still more preferably 170 or more. The aluminum alloy material of the present disclosure having such a high strength may be used as an alternative to materials prepared by high strength wire drawing of Cu—Sn-based or Cu—Cr-based dilute copper alloy. The aluminum alloy material may also be used as an alternative to steel-based or stainless steel-based materials. The upper limit of the Vickers hardness (HV) of the aluminum alloy material of the present disclosure is not particularly limited, and is, for example, 330, and preferably 280.

[Tensile Strength]

Tensile strength is measured in accordance with JIS Z 2241:2011. Conditions of measurement will be described in detail in the section of Examples below.

When the aluminum alloy material of the present disclosure is particularly in the form of a wire rod or a bar, the aluminum alloy material has a tensile strength of preferably 450 MPa or more. This is comparable to the strength of a usual copper wire prepared by wire drawing at a high degree of working. The aluminum alloy material has a tensile strength of more preferably 520 MPa or more, further preferably 560 MPa or more, particularly preferably 600 MPa or more, and still more preferably 640 MPa or more. The aluminum alloy material of the present disclosure having such a high strength may be used as an alternative to materials prepared by high strength wire drawing of Cu—Sn-based or Cu—Cr-based dilute copper alloy. The aluminum alloy material may also be used as an alternative to steel-based or stainless steel-based materials. The upper limit of the tensile strength of the aluminum alloy material of the present disclosure is not particularly limited, and is, for example, 1,000 MPa.

The aluminum alloy material of the present disclosure also preferably has excellent heat resistance. The high tensile strength of the aluminum alloy material of the present disclosure described above can be maintained even after heating. More specifically, the aluminum alloy material of the present disclosure has a tensile strength of preferably 300 MPa or more, more preferably 400 MPa or more, and further preferably 500 MPa or more, as measured after heating at 110° C. for 24 hours.

(5) Application of Aluminum Alloy Material of the Present Disclosure

The aluminum alloy material of the present disclosure may be used in various applications in which an iron-based material, a copper-based material and an aluminum-based material are used. More specifically, the aluminum alloy material can be suitably used as a conductive member such as an electric wire or a cable, a battery member such as a mesh or a net for a current collector, a fastening component such as a screw, a bolt or a rivet, a spring component such as a coil spring, a spring member for an electric contact such as a connector or a terminal, a structural component such as a shaft or a frame, a guide wire, a bonding wire for a semiconductor, and a winding wire used for a dynamo or a motor. Furthermore, since the aluminum alloy material of the present disclosure preferably has excellent heat resistance, the aluminum alloy material is more suitable particularly for applications in which heat resistance is required.

More specific application examples of conductive members include a power electric wire such as an overhead power line, OPGW, an underground electric wire, or a submarine cable, a communication electric wire such as a telephone cable or a coaxial cable, an appliance electric wire such as a cable for a wired drone, a cab tire cable, a charging cable for an EV and HEV, a twisted cable for offshore wind power generation, an elevator cable, an umbilical cable, a robot cable, a train overhead wire, or a trolley wire, a transportation electric wire such as an automobile wire harness, a marine electric wire, and an electric wire for aircrafts, a bus bar, a lead frame, a flexible flat cable, a lightning rod, an antenna, a connector, a terminal, and a cable braid.

Examples of battery members include a solar cell electrode.

More specific application examples of structural members include a scaffold in a construction site, a conveyor mesh belt, a metal fiber for clothing, a chain armor, a fence, an insect repellent net, a zipper, a fastener, a clip, aluminum wool, a bicycle component such as a brake wire or a spoke, a reinforcement wire for tempered glass, a pipe seal, a metal gasket, a material for protecting and reinforcing a cable, a core metal for a fan belt, a wire for driving an actuator, a chain, a hanger, a soundproof mesh, and a shelf board.

More specific application examples of fastening members include a set screw, a staple, and a push pin.

More specific application examples of spring members include a spring electrode, a terminal, a connector, a spring for a semiconductor probe, a blade spring, and a flat spiral spring.

Other suitable applications include metal fiber added to a resin-based material, a plastic material or cloth to give conductivity or to control strength and elastic modulus.

Still other suitable applications include consumer or medical members such as an eyeglasses frame, a watch belt, a fountain pen tip, a fork, a helmet, and an injection needle.

Embodiments of the present disclosure have been described above, but the present disclosure is not limited to the above embodiments, and encompasses all aspects included in the concept and the claims of the present disclosure. The present disclosure may be modified in various ways within the scope of the present disclosure.

EXAMPLES

Next, Example and Comparative Examples will be described to further clarify the effect of the present disclosure, but the present disclosure is not limited to these Examples.

Examples 1 to 30

First, bars having the alloy composition shown in Table 1 were prepared. Next, using the respective bars, an aluminum alloy wire rod (final diameter: 0.85 mm ϕ) was produced under the manufacturing condition shown in Table 1. Bars having a diameter with which a predetermined degree of working is achieved at the final diameter were prepared.

Comparative Example 1

In Comparative Example 1, an aluminum wire rod (final diameter: 0.85 mm ϕ) was produced under the manufacturing condition shown in Table 1 using a bar made of 99.99% by mass of Al.

Comparative Examples 2 to 5

In Comparative Examples 2 to 5, an aluminum alloy wire rod (final diameter: 0.85 mm ϕ) was produced under the manufacturing condition shown in Table 1 using the respective bars having the alloy composition shown in Table 1.

Manufacturing conditions A to 1 shown in Table 1 are specifically as follows.

<Manufacturing Condition A>
The bar prepared was subjected to cold working [1] at a degree of working of 2.0. No refine annealing [2] was performed.

<Manufacturing Condition B>
The bar was subjected to cold working [1] under the same condition as Manufacturing condition A except that the degree of working of cold working [1] was 4.0.

<Manufacturing Condition C>
The bar was subjected to cold working [1] under the same condition as Manufacturing condition A except that the degree of working of cold working [1] was 5.0.

<Manufacturing Condition D>
The bar was subjected to cold working under the same condition as Manufacturing condition A except that the degree of working of cold working [1] was 5.5.

<Manufacturing Condition E>
The bar was subjected to cold working [1] under the same condition as Manufacturing condition A except that the degree of working of cold working [1] was 8.5.

<Manufacturing Condition F>
The bar was subjected to cold working [1] under the same condition as Manufacturing condition A except that the degree of working of cold working [1] was 9.5.

<Manufacturing Condition G>
The bar prepared was subjected to cold working [1] at a degree of working of 2.0, and then refine annealing [2] was performed at a treatment temperature of 80° C. for a retention time of 2 hours.

<Manufacturing Condition H>
The bar was subjected to cold working [1] under the same condition as Manufacturing condition G except that the degree of working of cold working [1] was 4.0.

<Manufacturing Condition I>
The bar was subjected to cold working [1] under the same condition as Manufacturing condition G except that the degree of working of cold working [1] was 5.0.

<Manufacturing Condition J>
The bar was subjected to cold working [1] under the same condition as Manufacturing condition G except that the degree of working of cold working [1] was 5.5.

<Manufacturing Condition K>
The bar was subjected to cold working [1] under the same condition as Manufacturing condition G except that the degree of working of cold working [1] was 8.5.

<Manufacturing Condition L>
The bar was subjected to cold working [1] under the same condition as Manufacturing condition G except that the degree of working of cold working [1] was 9.5.

<Manufacturing Condition M>
The bar was subjected to cold working [1] under the same condition as Manufacturing condition A except that the degree of working of cold working [1] was 1.0.

Comparative Examples 7 to 9

Manufacturing Condition N of Table 1

The respective bars having the alloy composition shown in Table 1 were subjected to cold working [1] at a degree of working of 2.0. However, breaking of wire occurred at many portions and thus the work was discontinued.

Example 31

Manufacturing Condition O of Table 1

A bar having the alloy composition shown in Table 1 was subjected to cold working [1] at a degree of working of 2.0, and then the resultant was rolled to give an aluminum alloy plate (final plate thickness 0.85 mm, width 1.0 mm). No refine annealing [2] was performed.

Example 32

Manufacturing Condition P of Table 1

A bar having the alloy composition shown in Table 1 was subjected to cold working [1] at a degree of working of 6.5, and then the resultant was rolled to give an aluminum alloy plate (final plate thickness 0.85 mm, width 1.0 mm). No refine annealing [2] was performed.

Comparative Examples 10

Manufacturing Condition Q of Table 1

An ingot having an alloy composition obtained by adding 2.5% by mass of Mg to pure Al bare metal (JIS A1070) was produced, and the ingot was subjected to homogenizing heat treatment at 560° C. for 24 hours. Then a plate material was prepared by cold working. The plate material was recrystallized at 320° C. for 4 hours, and then subjected to cold working [1] at a degree of working of 3.0 to obtain an aluminum alloy plate (final plate thickness 0.85 mm). No refine annealing was performed.

Comparative Example 11

Manufacturing Condition R of Table 1

An aluminum alloy having the composition shown in Table 1 was melted and an ingot was prepared by semi-continuous casting. The ingot was subjected to homogenizing heat treatment at 480° C. Then, the resultant was hot-rolled (starting temperature: 400° C., end temperature: 330° C.) to give a hot-rolled plate. Subsequently, the plate was subjected to cold working [1] at a degree of working of 1.9 and refine annealing at 175° C. for 4 hours to obtain an aluminum alloy plate (final plate thickness 0.85 mm).

[Evaluation]

Properties of the aluminum alloy wire rods and the aluminum alloy plates (hereinafter referred to as "aluminum alloy material") according to Examples and Comparative Examples above were evaluated as shown below. Conditions of evaluation of the respective properties are as follows. The results are shown in Table 1.

[1] Alloy Composition

The alloy composition was analyzed by emission spectroscopy according to JIS H1305:2005. The measurement was performed using an emission spectrophotometer (manufactured by Hitachi High-Tech Science Corporation).

[2] Observation of Structure

The metallographic structure was observed using a scanning ion microscope (SMI3G50TB manufactured by Seiko instruments Inc.) based on SIM (Scanning Ion Microscope). The observation was performed at an accelerating voltage of 30 kV. The above aluminum alloy materials were worked at a cross-section parallel to longitudinal direction (working direction X) by FIB (Focused Ion Beam) and finished by ion milling to be used as observation samples.

A gray contrast was used in the SIM observation. The difference in contrasts was regarded as a crystal orientation, and the boundary at which the contrast varies discontinuously was defined as a crystal grain boundary. In some cases there may be no difference in the gray contrast even if the crystal orientations are different depending on the condition of electron diffraction. In such cases, the observation surface was photographed under several diffraction conditions while changing the angle between the electron beam and the sample by inclining the two orthogonal rotational axes in steps of ±3° on the sample stage of an electron microscope, to recognize the grain boundary. The field of observation was (15 to 40) μm×(15 to 40) μm. The position near the middle between the center and the surface layer on a line perpendicular to longitudinal direction of the aluminum alloy material (a position about ¼ the diameter or plate thickness to the center from the surface layer) in the above cross-section was observed. The field of observation was appropriately adjusted based on the size of crystal grains. Each sample was observed at three positions.

Figure 4:
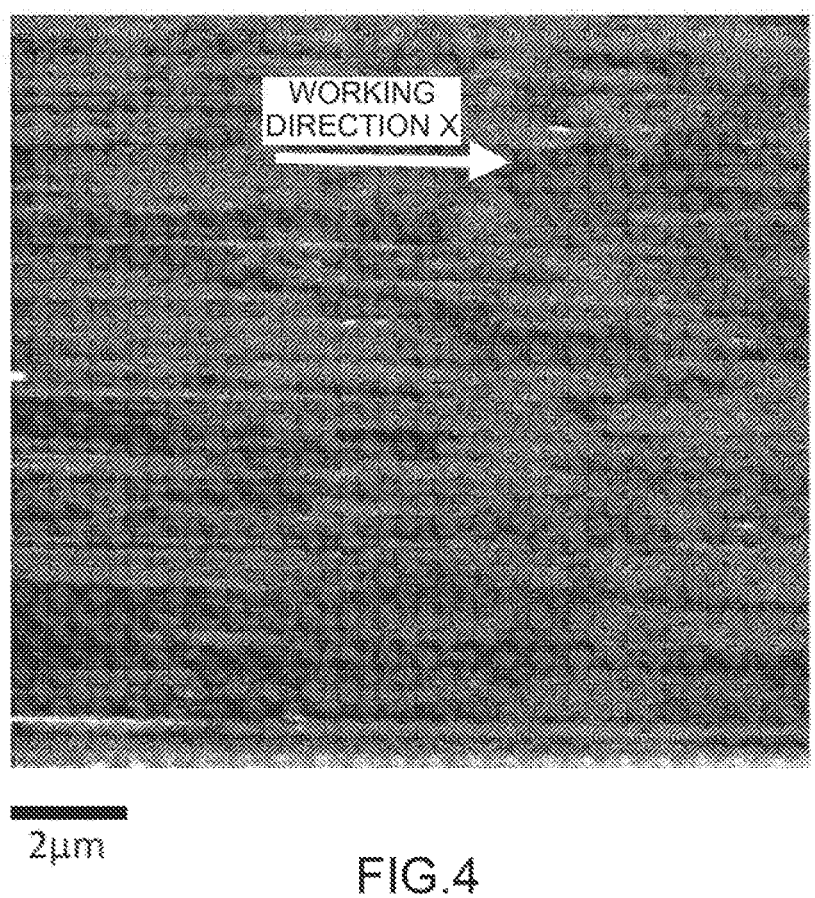
FIG. 4 is a SIM image of the state of a metallographic structure of the aluminum alloy material of Example 2 in a cross-section parallel to working direction X.

Then, the presence of the fibrous metallographic structure was determined in a cross-section parallel to longitudinal direction (working direction X) of the aluminum alloy material from the image photographed in the SIM observation. FIG. 4 is a part of the SIM image of a cross-section parallel to longitudinal direction (working direction X) of the aluminum alloy material of Example 2, which was photographed in the SIM observation. In the present Examples, for those in which a metallographic structure as shown in FIG. 4 was found, the fibrous metallographic structure was determined as "present."

Furthermore, 100 crystal grains were randomly selected out of the crystal grains in each field of observation, and the size perpendicular to longitudinal direction of the crystal grain and the size parallel to longitudinal direction of the crystal grain were measured to calculate the aspect ratio of the crystal grain. Moreover, the average value of the sizes perpendicular to longitudinal direction of the crystal grains and the average value of aspect ratios were calculated based on the total number of the crystal grains observed. When the sizes of the crystal grains observed were apparently larger than 400 nm, the number of crystal grains selected to measure the sizes was reduced, and the average value of those was each calculated. Furthermore, when the size of crystal grains parallel to longitudinal direction thereof is apparently 10 or more times the size perpendicular to longitudinal direction thereof, those crystal grains were all determined to have an aspect ratio of 10 or more.

[3] 0.2% Yield Strength

First, samples for measurement were prepared. The wire rods of Examples 1 to 30 and Comparative Examples 1 to 5, which were obtained by wire drawing, were directly used as a sample for measurement. Furthermore, the aluminum alloy plates of Examples 31, 32, which were obtained by rolling, were directly used as a sample for measurement. The aluminum alloy plate of Comparative Example 10 was punched after rolling to have a width of 1.0 mm, and this was used as a sample for measurement. Furthermore, the aluminum alloy plate of Comparative Example 11 was cut after rolling to have a width of 1.0 mm, and this was used as a sample for measurement.

The respective samples for measurement were subjected to a tensile test according to JIS Z2241:2011 using a precision universal tester (manufactured by Shimadzu Corporation) to measure 0.2% yield strength. The above test was performed at a stain rate of $2\times10^{-3}$/s. In the tensile test, three pieces of the respective aluminum alloy materials were tested (N=3), and the average value thereof was determined as the 0.2% yield strength of the aluminum alloy material. The higher the 0.2% yield strength, the better. A 0.2% yield strength of 400 MPa or more was determined as acceptable in the present Examples.

[4] Tensile Strength

A tensile test was performed according to JIS Z2243:2011 using a precision universal tester (manufactured by Shimadzu Corporation) to measure tensile strength (MPa). The above test was performed at a stain rate of $2\times10^{-3}$/s. The Samples for measurement of the respective aluminum alloy materials were prepared in the same manner as in the measurement of 0.2% yield strength. Mere, aluminum alloy materials which were manufactured under conditions A to R above were used as they are, and aluminum alloy materials which were further heated at 110° C. for 24 hours after manufacture were used. The tensile strength of three pieces of each was measured (N=3). The average value thereof was determined as the tensile strength of the aluminum alloy material before heating and the tensile strength of the aluminum alloy material after heating, respectively. In the present Examples, aluminum alloy materials before heating having a tensile strength of 450 MPa or more were rated as good. Aluminum alloy materials after heating having a tensile strength of 300 MPa or more were rated as good.

[5] Vickers Hardness (HV)

Vickers hardness (HV) was measured by using a microhardness tester HM-125 (manufactured by Akashi Corporation (current Mitutoyo Corporation)) according to JIS Z2244:2009. In the test, the test force was 0.1 kgf and the retention time was 15 seconds. The measurement position was a position near the middle between the center and the surface layer on a line perpendicular to longitudinal direction of the aluminum alloy material (a position about ¼ the diameter or plate thickness to the center from the surface layer) in a cross-section parallel to longitudinal direction of the aluminum alloy material. The average value of the measured values (N=5) was determined as the Vickers hardness (HV) of the respective aluminum alloy materials. When the difference between the maximum and the minimum of the measured value was 10 or more, the number of the materials to be measured was increased, and the average value of the measured values (N=10) was determined as the Vickers hardness (HV) of the respective aluminum alloy materials. The higher the Vickers hardness (HV), the better. A Vickers hardness (HV) of 125 or more was determined as acceptable in the present Examples.

TABLE 1

| | | Alloy composition (% by mass) | | | | | | | Manufacturing Condition | Evaluation of structure | | | Evaluation of properties | | | |
| --- | --- | --- | --- | --- | --- | --- | --- | --- | --- | --- | --- | --- | --- | --- | --- | --- |
| | | Mg | One or more selected from Cu, Ag, Zn, Ni, Co, Au, Mn, Cr, V, Zr and Sn | | total | Fe | Si | Al and inevitable impurities | | Fibrous metallographic structure | Size perpendicular to longitudinal direction of crystal grain | Aspect ratio | 0.2% yield strength [MPa] | Tensile strength (TS) | | Vickers hardness (HV) |
| | | | 1 | 2 | | | | | | | | | | Before heating [MPa] | After heating [MPa] | |
| Example | 1 | 4.4 | Mn 0.68 | Cr 0.14 | 0.82 | 0.05 | 0.04 | Balance | A | Present | 260 nm | ≥10 | 420 | 470 | 430 | 138 |
| | 2 | 4.4 | Mn 0.68 | Cr 0.14 | 0.82 | 0.05 | 0.04 | Balance | B | Present | 160 nm | ≥10 | 570 | 580 | 510 | 151 |
| | 3 | 4.4 | Mn 0.68 | Cr 0.14 | 0.82 | 0.05 | 0.04 | Balance | C | Present | 110 nm | ≥10 | 660 | 600 | 590 | 185 |
| | 4 | 4.4 | Mn 0.68 | Cr 0.14 | 0.82 | 0.05 | 0.04 | Balance | G | Present | 310 nm | ≥10 | 410 | 460 | 440 | 130 |
| | 5 | 4.4 | Mn 0.68 | Cr 0.14 | 0.82 | 0.05 | 0.04 | Balance | H | Present | 180 nm | ≥10 | 520 | 550 | 520 | 155 |
| | 6 | 4.4 | Mn 0.68 | Cr 0.14 | 0.82 | 0.05 | 0.04 | Balance | I | Present | 150 nm | ≥10 | 580 | 620 | 560 | 178 |
| | 7 | 2.5 | Cu 0.15 | Zr 0.06 | 0.21 | 0.60 | 0.05 | Balance | C | Present | 140 nm | ≥10 | 580 | 610 | 560 | 168 |
| | 8 | 3.0 | V 0.15 | Ni 0.06 | 0.21 | 0.05 | 0.05 | Balance | C | Present | 130 nm | ≥10 | 600 | 630 | 560 | 174 |
| | 9 | 3.3 | Mn 0.91 | Co 0.25 | 1.16 | 0.06 | 0.03 | Balance | C | Present | 130 nm | ≥10 | 610 | 640 | 500 | 170 |
| | 10 | 5.8 | Mn 0.34 | Zr 0.12 | 0.45 | 0.51 | 0.15 | Balance | C | Present | 80 nm | ≥10 | 650 | 690 | 610 | 190 |
| | 11 | 6.0 | Mn 0.90 | Ag 0.24 | 1.14 | 0.05 | 0.05 | Balance | C | Present | 70 nm | ≥10 | 670 | 710 | 640 | 215 |
| | 12 | 4.4 | Mn 0.68 | Au 0.08 | 0.76 | 0.05 | 0.15 | Balance | B | Present | 160 nm | ≥10 | 580 | 580 | 520 | 163 |
| | 13 | 4.4 | Mn 0.23 | Zn 1.70 | 1.93 | 0.22 | 0.11 | Balance | C | Present | 110 nm | ≥10 | 610 | 640 | 390 | 180 |
| | 14 | 4.5 | Mn 0.55 | Cu 0.15 | 0.70 | 0.35 | 0.06 | Balance | B | Present | 160 nm | ≥10 | 570 | 590 | 550 | 155 |
| | 15 | 4.5 | Cr 0.20 | — | 0.20 | 0.7 | 0.06 | Balance | B | Present | 160 nm | ≥10 | 550 | 570 | 520 | 166 |
| | 16 | 4.5 | Zr 0.13 | — | 0.13 | 0.75 | 0.15 | Balance | B | Present | 170 nm | ≥10 | 520 | 560 | 520 | 159 |
| | 17 | 4.0 | — | — | — | 0.03 | 0.10 | Balance | C | Present | 140 nm | ≥10 | 560 | 600 | 350 | 159 |
| | 18 | 1.2 | Mn 0.55 | Cr 0.12 | 0.67 | 0.05 | 0.04 | Balance | D | Present | 290 nm | ≥10 | 440 | 510 | 470 | 135 |
| | 19 | 1.2 | Mn 0.55 | Cr 0.12 | 0.67 | 0.05 | 0.04 | Balance | E | Present | 180 nm | ≥10 | 510 | 580 | 530 | 142 |
| | 20 | 1.2 | Mn 0.55 | Cr 0.12 | 0.67 | 0.05 | 0.04 | Balance | F | Present | 120 nm | ≥10 | 580 | 530 | 570 | 148 |
| | 21 | 1.2 | Mn 0.55 | Cr 0.12 | 0.67 | 0.05 | 0.04 | Balance | J | Present | 310 nm | ≥10 | 410 | 490 | 450 | 135 |
| | 22 | 1.2 | Mn 0.55 | Cr 0.12 | 0.67 | 0.05 | 0.04 | Balance | K | Present | 210 nm | ≥10 | 480 | 550 | 510 | 140 |
| | 23 | 1.2 | Mn 0.58 | Cu 0.16 | 0.74 | 0.05 | 0.04 | Balance | L | Present | 150 nm | ≥10 | 540 | 580 | 530 | 141 |
| | 24 | 0.6 | Co 0.80 | Zr 0.10 | 0.90 | 0.19 | 0.15 | Balance | F | Present | 240 nm | ≥10 | 420 | 450 | 410 | 137 |
| | 25 | 1.5 | Zn 0.70 | Mn 0.10 | 0.80 | 0.05 | 0.05 | Balance | F | Present | 110 nm | ≥10 | 600 | 640 | 550 | 148 |
| | 26 | 1.5 | Mn 0.70 | Co 0.10 | 0.80 | 0.05 | 0.05 | Balance | F | Present | 80 nm | ≥10 | 550 | 530 | 520 | 210 |
| | 27 | 1.2 | Zr 0.12 | — | 0.12 | 0.05 | 0.11 | Balance | F | Present | 150 nm | ≥10 | 560 | 630 | 390 | 180 |
| | 28 | 1.5 | Cr 0.20 | — | 0.20 | 0.05 | 0.05 | Balance | F | Present | 120 nm | ≥10 | 610 | 650 | 560 | 148 |
| | 29 | 1.5 | — | — | — | — | — | Balance | F | Present | 130 nm | ≥10 | 540 | 570 | 320 | 156 |
| | 30 | 3.8 | Mn 0.54 | Ni 0.12 | 0.66 | 0.44 | 0.55 | Balance | C | Present | 120 nm | ≥10 | 510 | 580 | 530 | 165 |
| | 31 | 4.5 | Mn 0.70 | Cu 0.10 | 0.80 | 0.05 | 0.10 | Balance | O | Present | 190 nm | ≥10 | 480 | 520 | 480 | 150 |
| | 32 | 1.2 | Mn 0.55 | Cr 0.12 | 0.67 | 0.05 | 0.04 | Balance | P | Present | 220 nm | ≥10 | 480 | 500 | 460 | 138 |
| Comparative Example | 1 | — | — | — | — | — | — | Balance | E | Not present | 800 nm | 5 | 130 | 140 | 80 | 43 |
| | 2 | 1.2 | Mn 0.55 | Cr 0.12 | 0.67 | 0.05 | 0.05 | Balance | B | Not present | 400 nm | ≥10 | 300 | 380 | 320 | 103 |
| | 3 | 0.2 | Mn 0.07 | — | 0.07 | 0.21 | 0.17 | Balance | E | Not present | 500 nm | ≥10 | 320 | 380 | 220 | 103 |
| | 4 | 3.3 | Mn 0.65 | Cr 0.13 | 0.78 | 0.05 | 0.04 | Balance | D | Not present | — | — | Working cracks | | | |
| | 5 | 4.4 | Mn 0.68 | Cr 0.14 | 0.82 | 0.04 | 0.04 | Balance | M | Not present | 700 nm | ≥10 | 312 | 360 | 310 | 110 |
| | 7 | 6.5 | Mn 0.67 | Cr 0.14 | 0.81 | 0.05 | 0.04 | Balance | N | Not present | — | — | Working cracks | | | |

TABLE 1-continued

| | Alloy composition (% by mass) | | | | | | | | | Evaluation of structure | | | Evaluation of properties | | | |
|---|---|---|---|---|---|---|---|---|---|---|---|---|---|---|---|---|
| | | One or more selected from Cu, Ag, Zn, Ni, Co, Au, Mn, Cr, V, Zr and Sn | | | | | | Al and inevitable | Manufacturing | Fibrous metallographic | Size perpendicular to longitudinal direction of | Aspect | 0.2% yield | Tensile strength (TS) | | Vickers hardness |
| | Mg | 1 | | 2 | | total | Fe | Si | impurities | Condition | structure | crystal grain | ratio | strength [MPa] | Before heating [MPa] | After heating [MPa] | (HV) |
| 8 | 3.8 | Mn | 0.85 | Zn | 1.20 | 2.05 | 0.05 | 0.04 | Balance | N | Not present | | | Working cracks | Working cracks | | |
| 9 | 4.4 | Mn | 0.65 | Cr | 0.10 | 0.75 | 1.60 | 0.34 | Balance | N | Not present | | | Working cracks | | | |
| 10 | 2.5 | Cu | 0.30 | — | | | — | — | Balance | Q | Not present | 400 nm | 5 | 360 | 390 | 170 | 114 |
| 11 | 6.0 | Cu | | | | 0.30 | 0.20 | 0.10 | Balance | R | Not present | 800 nm | ≥10 | 400 | 415 | 340 | 121 |

Note:
In the table, underlined and bold ones mean that they were out of the proper range of the present disclosure or that the result of evaluation did not reach the acceptable level in the present Examples.

The results in Table 1 show that the aluminum alloy materials according to Examples 1 to 32 of the present disclosure have a specific alloy composition and have a fibrous metallographic structure in which crystal grains extend so as to be aligned in one direction and, an average value of size perpendicular to longitudinal direction of the crystal grains is 310 nm or less in a cross section parallel to the one direction. FIG. 4 is a SIM image of a cross-section parallel to the working direction of an aluminum alloy material of Example 2. Furthermore, a metallographic structure similar to that shown in FIG. 4 was found in the cross-section parallel to longitudinal direction or the aluminum alloy materials according to Examples 1 and 3 to 32. It has been found that the aluminum alloy materials according to Examples 1 to 32 of the present disclosure, which have such a specific metallographic structure, exhibit a high strength comparable to that of iron-based or copper-based metal materials (e.g., a 0.2% yield strength of 400 MPa or more and a Vickers hardness (HV) of 125 or more).

It has also been found that the alloy compositions of the aluminum alloy materials of Comparative Examples 1 to 3, 5, 10 and 11 do not satisfy the proper range of the present disclosure, or the aluminum alloy materials of Comparative Examples 1 to 3, 5, 10 and 11 do not have a fibrous metallographic structure in which crystal grains extend so as to be aligned in one direction, or neither of the above applies, and the sizes perpendicular to longitudinal direction of crystal grains are 400 nm or more. Both the 0.2% yield strength and the Vickers Hardness (HV) of the aluminum alloy materials of Comparative Examples 1 to 3, 5, 10 and 11 have been found to be significantly lower than those of the aluminum alloy materials of Examples 1 to 32 of the present disclosure.

Another finding is that since the alloy compositions of the aluminum alloy materials of Comparative Examples 7 to 9 do not satisfy the proper range of the present disclosure, working cracks occurred in cold working [1]. Furthermore, although the alloy composition of the aluminum alloy material of Comparative Example 4 satisfied the proper range of the present disclosure, working cracks occurred in cold working [1] because the degree of working was excessively high for the aluminum alloy material containing a high content of Mg.

What is claimed is:

1. An aluminum alloy material having an alloy composition comprising; Mg: 2.0% by mass or more and 6.0% by mass or less, Fe: 0% by mass or more and 1.50% by mass or less, Si: 0% by mass or more and 1.0% by mass or less, one or more selected from Cu, Ag, Zn, Ni, Ti, Co, Au, Mn, Cr, V, Zr and Sn: 0% by mass or more and 2.0% by mass or less in total, with the balance being Al and inevitable impurities,
   wherein the aluminum alloy material has a fibrous metallographic structure in which crystal grains extend so as to be aligned in one direction,
   an average value of grain sizes perpendicular to longitudinal direction of the crystal grains is 180 nm or less in a cross section parallel to the one direction,
   the aluminum alloy material has a Vickers hardness (HV) of 155 to 280, and
   the aluminum alloy material is in the form of a wire rod and the wire rod has a diameter of 10 mm or less.

2. The aluminum alloy material according to claim 1, comprising Mg: 3.0% by mass or more.

3. The aluminum alloy material according to claim 1, comprising one or more selected from Cu, Ag, Zn, Ni, Ti, Co, Au, Mn, Cr, V, Zr and Sn: 0.06% by mass or more in total.

4. The aluminum alloy material according to claim 1, comprising one or more members selected from the group consisting of Cu: 0.05% by mass or more and 0.20% by mass or less, Mn: 0.3% by mass or more and 1.0% by mass or less, Cr: 0.05% by mass or more and 0.20% by mass or less and Zr: 0.02% by mass or more and 0.20% by mass or less.

5. The aluminum alloy material according to claim 1, wherein the aluminum alloy material has a tensile strength of 300 MPa or more as measured after being heated at 110° C. for 24 hours.

6. A fastening component comprising the aluminum alloy material according to claim 1.

7. A structural component comprising the aluminum alloy material according to claim 1.

8. A spring component comprising the aluminum alloy material according to claim 1.

9. A conductive member comprising the aluminum alloy material according to claim 1.

10. A battery member comprising the aluminum alloy material according to claim 1.

11. The aluminum alloy material according to claim 1, comprising one or more members selected from the group consisting of Cu: 0.05% by mass or more and 0.20% by mass or less, Mn: 0.3% by mass or more and 1.0% by mass or less, Cr: 0.14% by mass or more and 0.20% by mass or less, and Zr: 0.02% by mass or more and 0.20% by mass or less.

\* \* \* \* \*